Sept. 29, 1970　　　　　　H. D. GREGG　　　　　　3,530,717
WHEEL ROUNDING MACHINE

Original Filed May 10, 1967　　　　　　　　　　　　4 Sheets-Sheet 2

INVENTOR.
Horace D. Gregg.
BY
Harness Dickey & Pierce
ATTORNEYS.

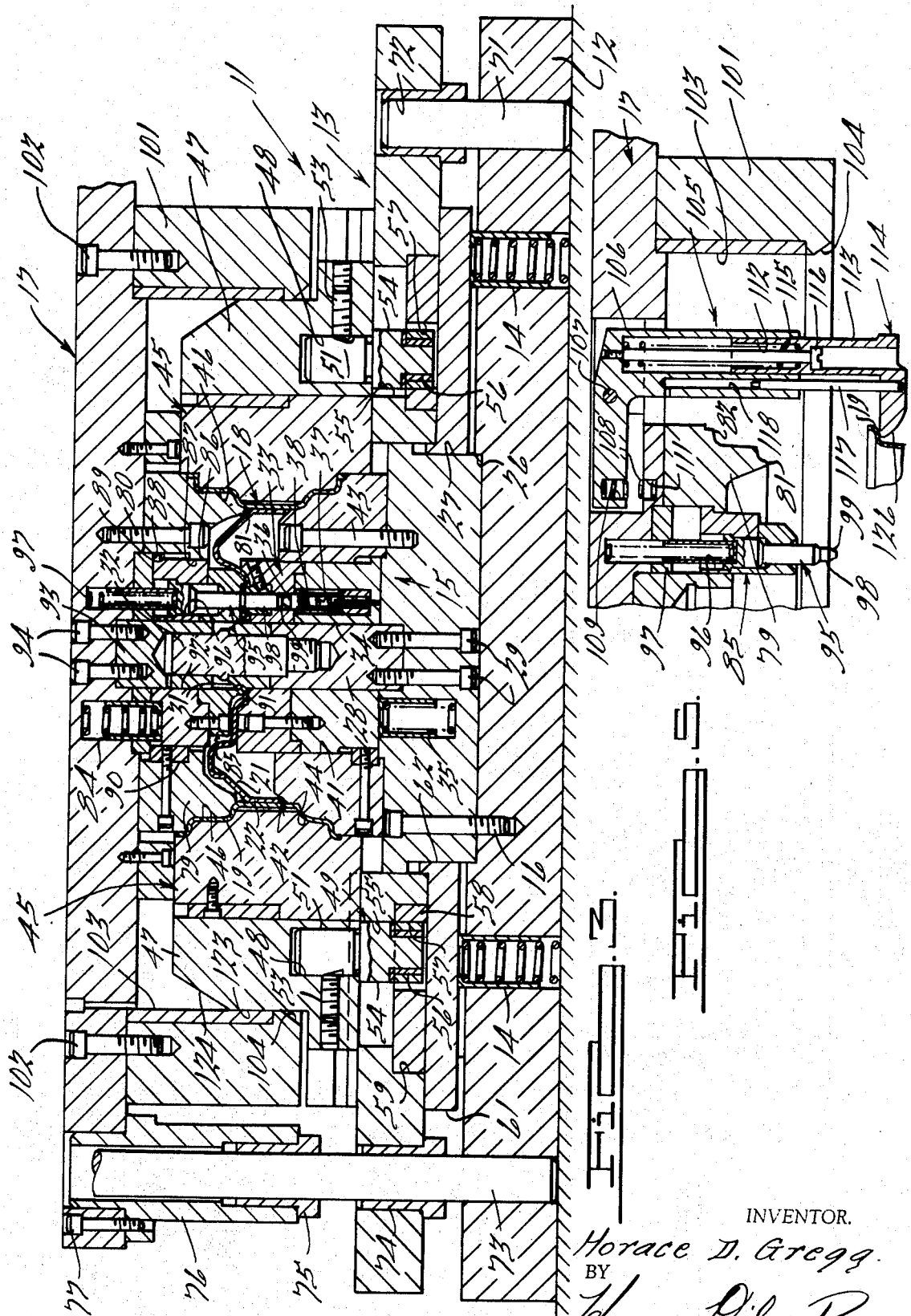

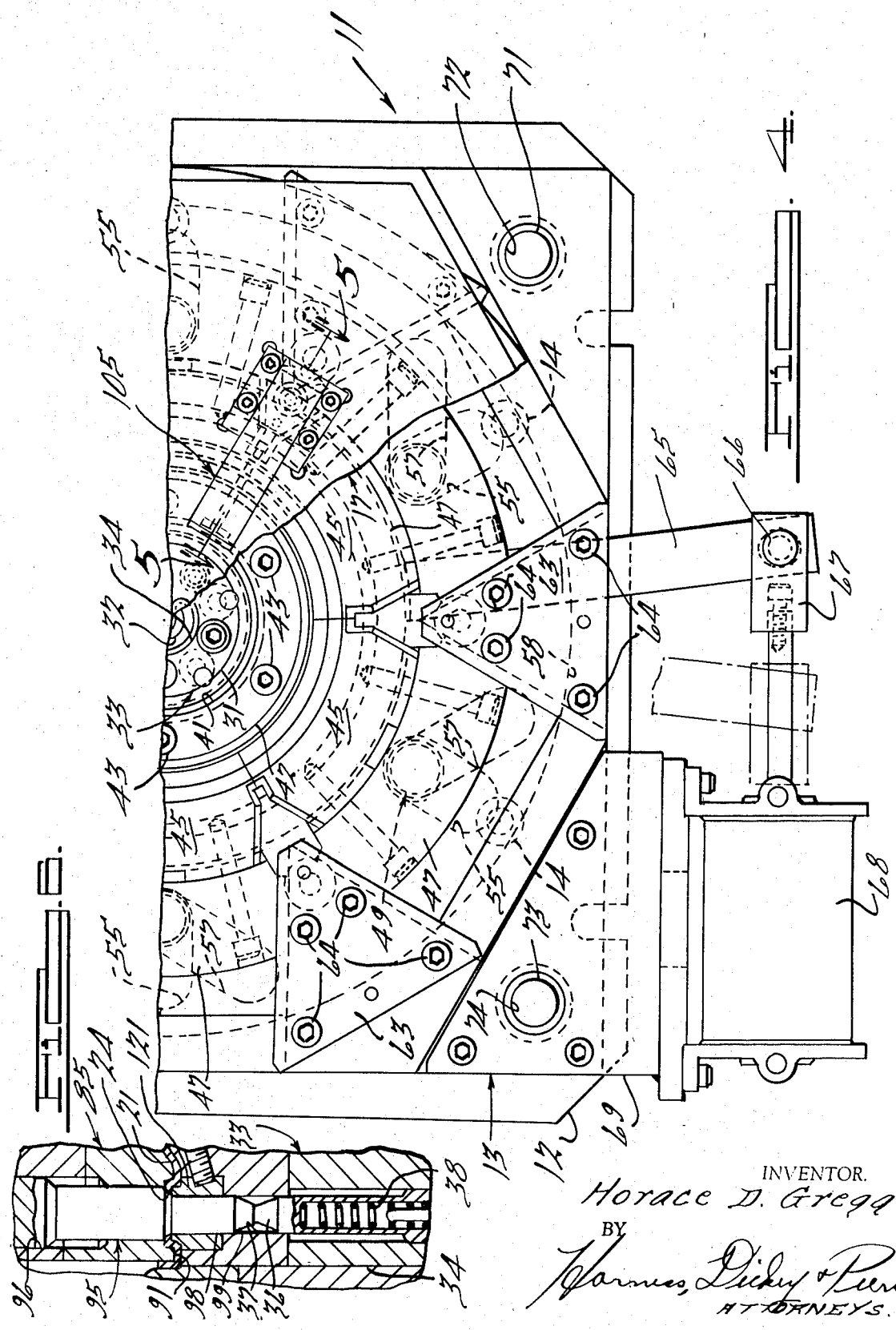

3,530,717
WHEEL ROUNDING MACHINE
Horace D. Gregg, Wayne, Mich., assignor to Kelsey-Hayes Company, a corporation of Delaware
Continuation of application Ser. No. 637,424, May 10, 1967. This application Apr. 22, 1969, Ser. No. 826,760
Int. Cl. B21d 22/00
U.S. Cl. 72—354                                17 Claims

ABSTRACT OF THE DISCLOSURE

This application discloses a machine having a plurality of dies that coact with an assembled wheel to true any axial or radial runout present in the wheel rim and for performing certain other forming operations simultaneously with the truing. The machine is comprised of a fixed base plate having a pilot die that engages and locates the wheel spider and is adapted to engage the inner periphery of the rim. Rounding dies are supported for movement in a radial direction and engage the periphery of the rim, which is preferably formed oversize when the wheel is assembled, for bringing the rim into axial and radial alignment. When the rim is held in its true position by the rounding dies, a machining or forming operation is performed upon a locating opening in the spider so that the rim will be true with respect to its axis of rotation as defined by this locating opening. If the wheel is located by its central opening, a machining operation may be performed upon this central opening when the rim is held in its true position. If the wheel is located by the attachment holes formed in the spider around the central opening, these holes may be accurately located and formed by forming members carried by a ram that engage the spider and which accomplish a finish forming operation upon the wheel attachment holes of the spider. Liftout fingers are pivotally carried by the ram for lifting the rounded wheel out of the die base assembly.

PRIOR APPLICATION

This application is a continuation of my copending application of the same title, Ser. No. 637,424, filed May 10, 1967, now abandoned, and assigned to the assignee of this invention.

BACKGROUND OF THE INVENTION

This invention relates generally to the wheel making art and more particularly to a machine for rounding and forming assembled wheels for motor vehicles.

In its most conventional form, a wheel for a motor vehicle is comprised of a rim onto which a tire is mounted and a spider that supports the rim and provides means for attachment to a spindle, brake drum or other like associated part of the vehicle. It is essential that the rim and spider, in their assembled relationship, insure perfect roundness of the rim and accurate axial alignment of the rim with respect to the spider, deviations in the respective directions being termed "radial" and "axial runout." Vehicle manufacturers establish extremely rigid specifications in the tolerances for these dimensions. When the wheels are manufactured, the rim is normally formed as a separate component from the spider and these two elements are fixed together by riveting, welding or some other like method to form the complete wheel assembly. In previously proposed methods for attaining the desired wheel roundness, the rim has been maintained in the desired shape before assembly to the spider and accurate dimensional control was maintained on the spider. This method does not insure perfect roundness, however.

It is, therefore, a principal object of this invention to provide a machine for rounding assembled wheels.

It is a further object of the invention to provide a machine for rounding assembled wheels and for performing other operations thereupon simultaneously with the rounding.

The rounding of the wheel should insure that its rim is concentric with the axis of rotation of the wheel. Normally, the wheel is affixed for rotation with respect to the vehicle and is located about its rotational axis in one of two ways. One way in which this location is accomplished is by accurately forming a central hub opening in the spider that coacts with an associated portion of the vehicle. In the other method, the attachment bolt holes in the spider are accurately located and define the axis of rotation. With either method, it is essential that the axis of the rim be coincident with the axis of rotation.

It is, therefore, another object of this invention to provide a machine that insures concentricity between the rim of a wheel and its axis of rotation.

It is a yet further object of this invention to provide a machine that will accurately establish the axis of rotation of a wheel when its rim is held in a true circular shape.

SUMMARY OF THE INVENTION

A machine embodying this invention is particularly adapted for rounding assembled wheels or the like having a spider and a rim. The machine comprises pilot means adapted to coact with the spider of an assembled wheel for accurately locating the wheel. A plurality of rounding die means are supported for reciprocation in a generally radial direction with respect to the wheel located by the pilot means. Means are provided to reciprocate the rounding die means from a retracted position wherein an assembled wheel may be loaded onto or removed from the pilot means to a wheel rounding position wherein the rounding die means engage and deform the rim for rounding the wheel. In a preferred form of the invention, the machine further includes means for accurately forming one or more locating openings formed in the spider of the wheel when the rim is rounded. This operation may be performed by a machining method or through the use of cooperating punch and die assemblies.

BRIEF DESCRIPTION OF THE DRAWINGS

FIGS. 1 through 3 are cross sectional views taken through a wheel rounding machine embodying this invention and showing the machine in different stages during the sequence of its operation.

FIG. 1 shows the machine with an assembled wheel in position and before the wheel is engaged by the rounding dies.

FIG. 2 shows the relationship after the rounding dies have been brought into engagement with the wheel rim.

FIG. 3 shows the machine as it appears at the final forming stage.

FIG. 4 is a top plan view, with portions broken away, of a segment of a machine.

FIG. 5 is a cross sectional view taken generally along the line 5—5 of FIG. 4 but shows the components in a different position.

FIG. 6 is an enlarged view showing the locating pins in a position corresponding to that shown in FIG. 3.

DETAILED DESCRIPTION OF THE PREFERRED EMBODIMENT

Figure 1:
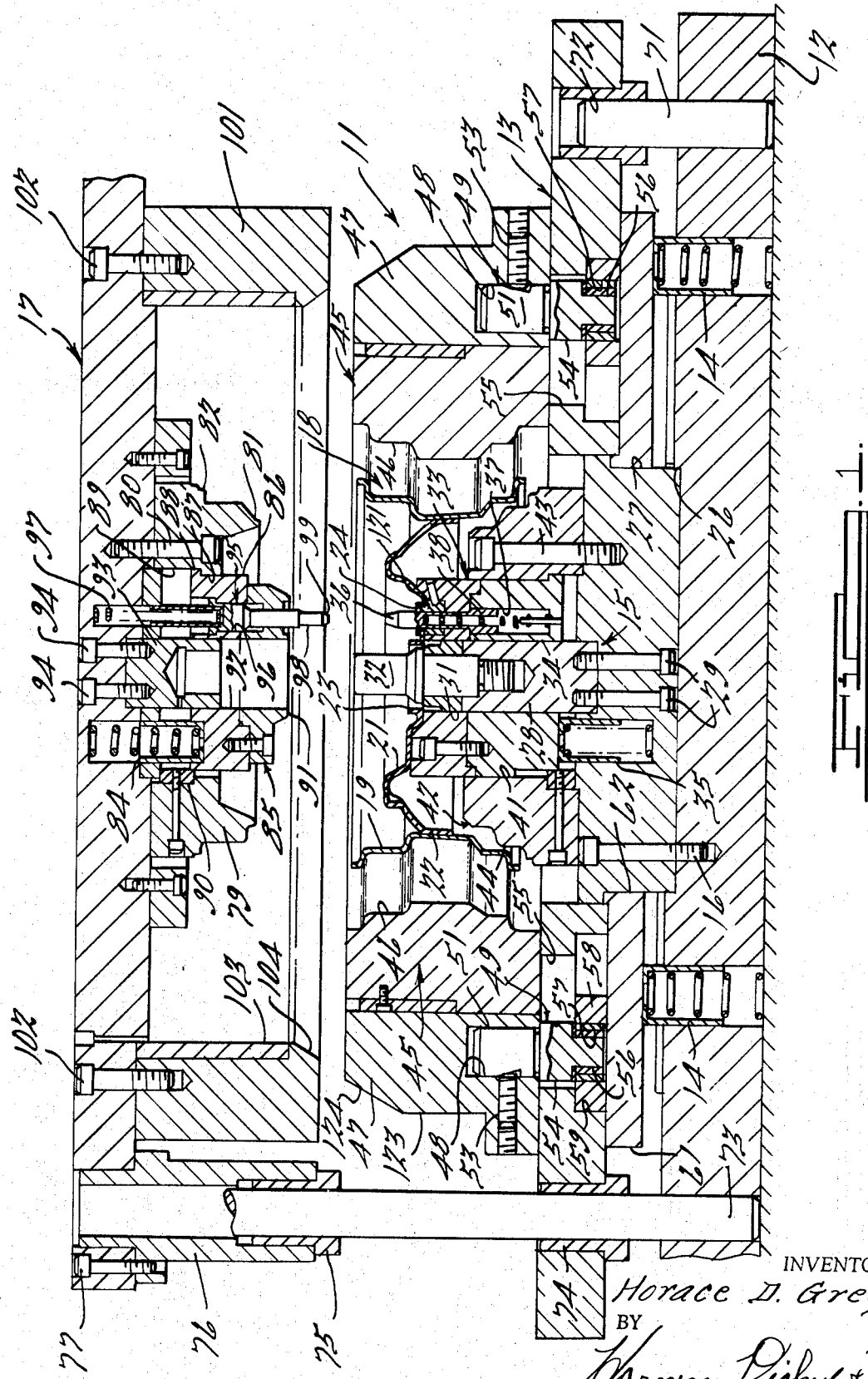

In the drawings, the reference numeral 11 generally identifies a wheel rounding machine embodying this invention. The wheel rounding machine 11 is comprised of a base plate 12 upon which a lower die supporting plate, indicated generally by the reference numeral 13, is supported by a plurality of die cushions 14 of any known type. A fixed pilot assembly 15 is rigidly affixed to the base plate 12 by means of a plurality of socket head studs 16 (only one of which appears in the drawings). A ram assembly 17 is associated with the base plate 12 and is supported for reciprocation with respect to the base plate 12 in any known type of press assembly so that the ram assembly 17 is reciprocated with respect to the base plate assembly 12.

The machine 11 is particularly adapted for rounding assembled vehicular wheels, indicated generally by the reference numeral 18, one of which is shown in its assembled condition in FIG. 1. The wheel 18 is comprised of a rim portion 19 onto which a conventional tire may be supported. The rim portion 19 is connected to a spider portion 21 by a flange 22 of the latter, which flange may be affixed as by welding or riveting to the wheel rim 19. The spider 21 is formed with a hub opening 23 around which a plurality of circumferentially spaced openings 24 are formed. The hub opening 23 is adapted to receive the hub or spindle of a motor vehicle and the openings 24 pass studs for attachment of the wheel 18 to the vehicle in a known manner. In its assembled state (FIG. 1), the rim 19 is somewhat oversize. That is, the rim 19 has a larger diameter than the desired finished diameter. Due to manufacturing variations, the rim 19 may be out-of-round radially with respect to the hub opening 23 and axially with respect to the plane of the hub opening 23. It is these manufacturing variations that the wheel rounding machine 11 corrects as well as bringing the rim 13 into its desired finished diameter.

Referring again to the construction of the machine 11, the base plate 12 is formed with a central recess 26 in which a cylindrical section 27 of the fixed pilot assembly 15 is positioned. A first pilot member 28 having a generally cylindrical configuration is affixed to the center of the fixed pilot assembly 15 by means of socket-headed bolts 29. The first pilot member 28 extends upwardly and has two pilot members 31 and 32 fixed to its upper end by the latter. The pilot member 31 has an exterior surface that is adapted to engage the hub opening 23 defined by the spider 21, as will become more apparent as this description proceeds.

A generally annular die assembly 33 has a cylindrical bore 34 that provides a slidable support upon the pilot member 28 and is urged upwardly relative to the base plate assembly 15 by means of a plurality of circumferentially spaced die cushions 35 (only one of which appears in the drawings). Locating pins 36 (FIG. 6) are supported for reciprocation in bores 37 formed in the die assembly 33, there being a number of locating pins 36 equal to the number of holes 24 formed in the wheel spider 21. The circumferential spacing of the locating pins 36 also conforms to the desired final spacing of the holes 24. Biasing springs 36 urge the locating pins 36 upwardly to the position shown in FIG. 1 so as to present the pins 36 to the wheel 18 when it is placed on the machine 11.

The outer periphery of the die assembly 33 is slidably supported in a bore 41 formed in a fixed die member 42 that is held to the base plate 15 by means of circumferentially spaced socket-headed bolts 43. The fixed die member 42 has an outer periphery 44 that conforms to the desired finished shape of one-half of the inner periphery of the wheel rim 19 with any allowance for spring-back which may be required.

A plurality of wheel rounding dies 45 are supported upon the lower die supporting plate 13 for reciprocation in a radial direction, as will become more apparent as this description proceeds. The wheel rounding dies 45 have surfaces 46 that are adapted to engage the outer periphery of the wheel rim 22 and particularly the tire beads and each of which conforms to the desired final shape of a segment of the rim 19 with any allowance for spring-back which may be required. Each of the dies 45 is affixed to a respective supporting jaw member 47 that has a cylindrical bore 48 formed in its lower face. One of a plurality of follower pins, indicated generally by the reference numeral 49, has a first cylindrical part 51 that is affixed in a respective one of the jaw bores 48 by means of a stud 53. A second cylindrical portion 54 of each of the pins 49 is received in a respective radially extending slot 55 formed in the die supporting plate 13. The slot 55 extends in a radial direction with respect to the pilot member 28. The lower end of each of the pins 49 is formed with a cylindrical portion 56 that is received in a respective angularly disposed slot 57 formed in a cam ring 58. The cam ring 58 is supported for oscillatory rotary movement in an annular recess 59 formed in the underside of the die supporting plate 13 and is vertically supported by a generally disc-shaped plate 61. The plate 61 is engaged on its underside by the die cushion assemblies 14. The plate 61 is formed with a cylindrical bore 62 that is slidably supported upon the cylindrical portion 27 of the die member 15.

Each of a plurality of guide members 63 (FIG. 4) is fixed to the die supporting plate 13 by a respective socket-headed bolt 64. The guide members 63 coact with the jaws 47 to restrain the latter and guide the jaws 47 for movement in a radial direction.

Referring now specifically to FIG. 4, an actuating lever 65 is rigidly affixed in any suitable manner to the cam ring 58 and extends outwardly from one side of the die supporting plate 13. The outer end of the actuating arm 65 is pivotally connected, by means of a pivot pin 66 to an actuating member 67 of a hydraulic or pneumatic cylinder 68. The cylinder 68 is, in turn affixed to the die assembly 13 by a supporting bracket 69. Actuation of the cylinder 68 reciprocates the number 67 and causes oscillation of the cam ring 58 about an axis coincident with the pilot portion 28. This movement causes the jaw assemblies 47 and the associated wheel rounding dies 45 to move radially inwardly or outwardly with respect to the assembled wheel contained upon the die pilot portion 28.

Each of a plurality of spaced, relatively short, upstanding pilot pins 71 is fixed to the base plate 12 and at a respective opposite corner of the latter. The upper ends of the pilot pins 71 are slidingly received in bearing members 72 affixed to the die supporting plate 13. Thus, the die supporting plate 13 is accurately located angularly with respect to the base plate 12 but is supported for limited reciprocation with respect to the base plate 12 by the die cushion assemblies 14. Longer pilot pins 73 fixed to opposite corners of the base plate 12 also extend through bearing members 74 formed in the die cushion assemblies 13 to assist in this location. The longer pilot pins 73 are also slidably received in bearnig members 75 supported by elongated cylindrical members 76 that are affixed to the ram assembly 17 by socket-headed bolts 77. Thus, the ram assembly 17 is accurately located angularly with respect to the lower die supporting plate 13. base plate 12 and their associated components.

A first upper die 79 is affixed to the ram assembly 17 by means of socket-headed bolts 80. The upper die 79 has a lower surface 81 that is adapted to engage the wheel 18 adjacent the juncture of the outer periphery of the spider 21 with the rim 19. The surface 81 merges into a second surface 82 that is adapted to engage the inner periphery of the wheel rim 19.

A plurality of circumferentially spaced die cushions 84 urges a second upper die assembly 85 downwardly with respect to the ram 17. The die assembly 85 has a cylindrical outer surface 86 that is guided in a cylindrical bore 87 of the first die 79. A somewhat larger cylindrical segment 88 of the die assembly 85 is received in a larger diameter bore 89 of the die assembly 79 to guide the die assembly 85 and to limit its outward movement with respect to the die assembly 79. A key 90 is affixed to the die 79 and is received in a complementary keyway in the die assembly 85 to preclude rotation of the die assembly 85. The die assembly 85 has a surface 91 that is adapted to engage the wheel spider 21 adjacent the hub opening 23 when the ram assembly 17 is in its lowermost position, as will become more apparent as this description proceeds. The die assembly 85 has a cylindrical inner bore 92 that is slidably supported upon a cylindrical supporting member 93 that is affixed to the ram assembly 17 by means of socket-headed bolts 94.

A plurality of forming members 95 are supported in bores 96 formed in the dies assembly 85 at spaced circumferential locations (FIG. 6). The forming members 95 are accurately located with respect to the locating pins 36 of the lower die assembly and coact with them in a manner which will become more apparent as this description proceeds. Coil springs 97 urge the forming members 95 outwardly away from the ram assembly 17. The forming members 95 have a cylindrical section 98 that terminates in a relatively sharp edge 99 and have a diameter that conforms to the desired finished diameter of the openings 24 in the wheel assembly 18.

A shroud ring 101 having a generally cylindrical configuration is affixed to the ram assembly 17 outwardly of the die assemblies 79 and 85 by means of socket-headed bolts 102. The shroud ring defines a cylindrical opening 103 that terminates at its lower end in an inclined cam surface 104.

A plurality of lift-out finger assemblies, indicated generally by the reference numeral 105 and shown in most detail in FIG. 5, are pivotally supported upon the ram assembly 17 in circumferentially spaced locations. The lift-out finger assemblies 105 comprise a generally L-shaped supporting member 106 that is pivotally supported with respect to the ram assembly 17 in an opening therein by means of a pin 107. A coil spring 108 is engaged in cylindrical recesses 109 and 111 formed in the supporting member 106 and ram assembly 17, respectively, to urge the lift-out finger assemblies 105 for pivotal movement in a clockwise direction as viewed in this figure.

The other arm of the supporting member 106 is formed with cylindrical bore 112 in which a cylindrical portion 113 of a lift-out finger 114 is supported for reciprocation. A coil spring 115 is contained within the bore 112 to urge the finger 114 away from the ram 17. An elongated bolt 116 is fixed to the supporting member 106 within the bore 112 to limit the outward movement of the finger 114. An alignment pin 117 is affixed to the finger 114 and slidably supported in a bore 118 formed in the supporting member 106 parallel to and adjacent the bore 112. The coaction of pin 117 with the bore 118 precludes rotation of the lift-out finger 114 while permitting its axial movement.

OPERATION

In operation, the disclosed apparatus is supported in any known type of press (not shown) and the ram assembly 17 is retracted away from the base plate 12 by the press with which it is associated a distance sufficient to permit as assembled wheel 18 to be positioned upon the base assembly 12. The rounding dies 45 and their associated supporting jaws 47 will have been moved radially away from the die 42 and pilot portion 28 by actuation of the cylinder 68. In this condition, the actuating arm 65 will occupy the dotted line position shown in FIG. 4 and the rounding dies 45 and jaws 47 will be positioned as in FIG. 1. It is to be understood that the ram 17 will be placed further away from the base plate 12 than shown in FIG. 1, this view being foreshortened to facilitate illustration.

An assembled wheel 18 is then located with its hub opening 23 adjacent the pilot portion 31, the actual location of the assembled wheel 18 being controlled by the locating pins 36 and by associated bushing members 121 associated therewith, which enter the openings 24 in the wheel spider 21. The assembled wheel 18 is then accurately located with respect to the base plate 12 as well as with respect to the overall machine 11. It is to be understood that in this state the rim 19 may have axial and radial runout. That is, the rim 19 may be out of round, or concentricity with respect to the hub opening 23 and may deviate axially from the plane of the opening 23. As has been previously noted, the rim 19 of the assembled wheel 18 is also larger in diameter than the desired finish diameter so as to facilitate the rounding operation. In addition to curing these size and shape variations, the machine 11 may perform certain forming operations upon the rim 19, and openings 23 and 24 as well as upon the spider 21. The number of forming operations so performed will depend upon the capacity of the machine and other factors.

Figure 2:
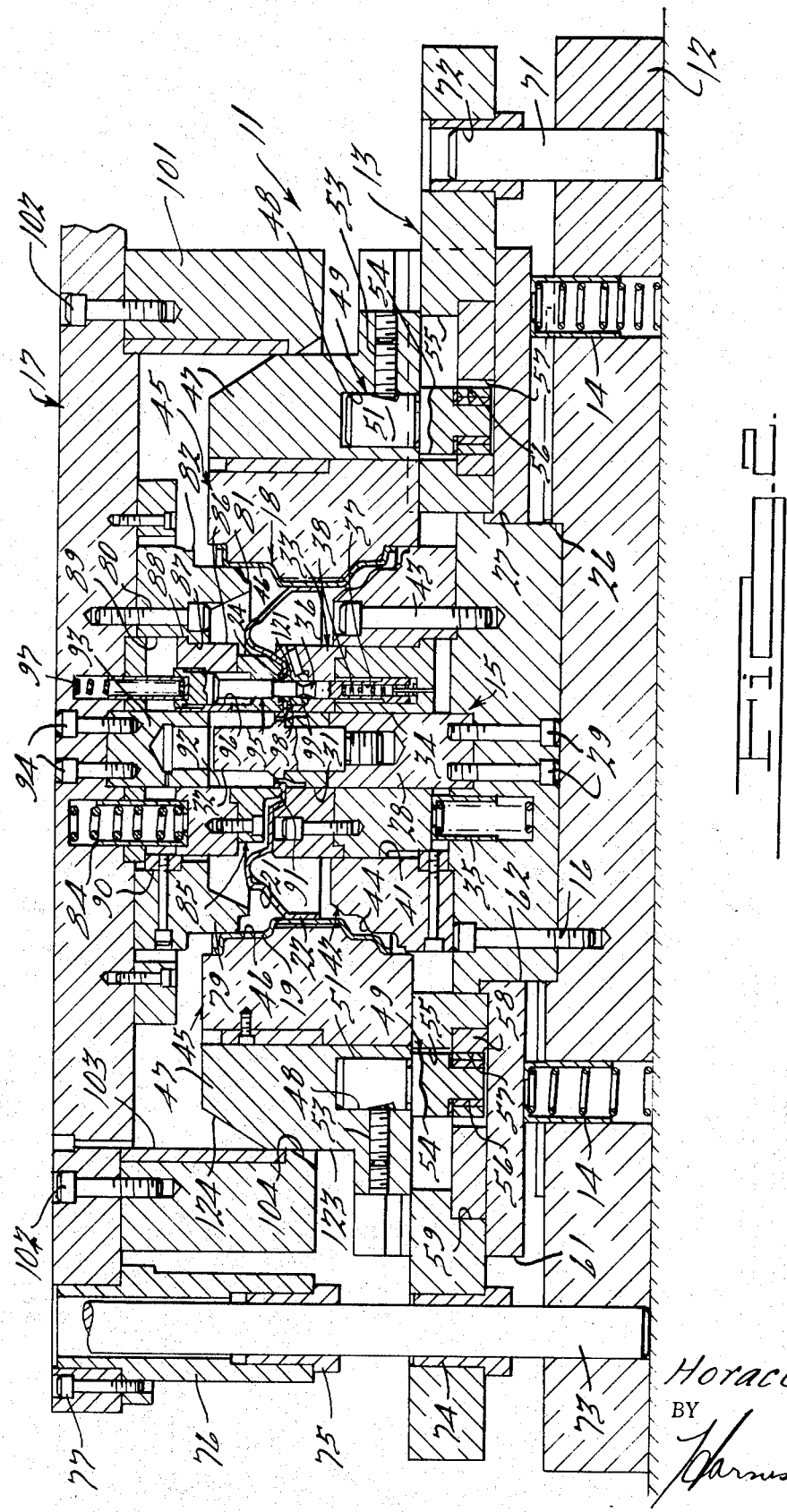

Once an assembled wheel 18 is accurately located on the machine 11, the operation is initiated in any known manner such as by closing a switch or by pressing a button. The cylinder 68 is thereby actuated in any known manner to rotate the actuating arm 65 and the associated ram ring 58 in a clockwise direction as viewed in FIG. 4 from the dotted line position to the solid line position. This rotation will cause the pins 49 to be driven radially inwardly in the respective slot 55 and drives the jaws 47 and wheel rounding dies 45 radially inwardly toward the rim 18. At the same time, the upper ram assembly 17 may commence its downward movement. The jaws 47 and dies 45 continue to move radially inwardly until the die surfaces 46 engage the outer periphery of the wheel rim 19 adjacent its tire beads. In this position, the cylindrical outer surface 123 of the jaws 47 will be spaced inwardly of the surface 103 of the shroud ring 101. The the jaws 47 have not reached this position due to some malfunction, the cam surface 104 of the shroud ring 101 will contact the inclined surfaces 124 formed at the upper end of the jaws 47 to drive them inwardly as the ram assembly 17 moves downwardly. Since the rim 19 is over-size, the die surfaces 81 and 82 of the upper die 79 and die surface 44 of the lower die 42 will not be fully engaged by the inner periphery of the rim 19 upon initial contact of the rounding die surfaces 46 with the outer periphery of the rim (FIG. 2).

As the ram assembly 17 continues to move downwardly, the forming pins 95 will contact the locating pins 36 and urge the latter downwardly against the action of the coil springs 38. It should be noted that the springs 97 are more rigid than the springs 38 so that the locating pins 36 will be retracted before the forming pins 95 undergo any relative movement with respect to the ram assembly 17. The downward movement of the ram assembly 17 continues until the die surfaces 91 and 81 engage the adjacent surfaces of the spider 21 and firmly press it into engagement with the lower die surfaces. Relative movement between the die 85 and ram assembly 17 and between die assembly 33 and base plate 12 then may occur due to compression of the die cushions 84 and 35, respectively. This engagement with the spider can accomplish some forming operation upon the spider, if desired. During the aforenoted movement, the forming surfaces 99 and 98 of the pins 95 will enter the wheel openings 24 (FIG. 3) and size the openings 24 as well as perform some circumferential locating, if desired.

The rounding dies 45 continue to move radially inwardly, engage the rim beads and force the rim 19 into engagement with the surfaces 81 and 82 of the die 79 and the die surface 44 of the die 42. It should be noted that the rounding dies 45 and associated jaws 47 will also move downwardly with respect to the base 12 due to the support upon the die support plate 13. In the fully closed position of the machine (FIG. 3), the wheel 18 will be deformed into its desired final position with some allowance made for spring-back, if necessary. Thus, the rounding operations, as well as certain forming operations, may be performed simultaneously.

As has been previously noted, the final position of the rim 19 should define an axis that is concentric with the axis about which the wheel 18 rotates. The wheel 18 may be rotated by the coaction of either the hub opening 23 or the openings 24 with the associated part of the vehicle. If the opening 23 performs the locating function, flat headed nuts are used in connection with the attachment studs that pass through the openings 24 so as to permit the wheel 18 to be accurately located. If the openings 24 are used for this location, tapered nuts are used and the opening 23 is oversize with respect to the hub upon which it is mounted. If the opening 23 is used for the locating function, it may be machined or otherwise formed, preferably while the rounding dies 49 are still engaged with the rim 19. The machining may be done by means of a reamer that extends through the support base assembly 12 or in any other known manner. Alternatively, the pilot member 31 may accomplish the forming operation. If the openings 24 are used to locate the wheel 18, they may be accurately sized and located by the forming pins 95 previously described. Alternatively, both types of forming operations may be performed.

The lift-out finger asemblies 105 are retracted during the closing operation of the machine 11 so that they will not interfere with the operation of the respective components. As has been noted, the rounding dies 45 substantially complete their radial inward movement before the ram assembly 17 reaches its lowermost position. The wheel rounding dies 45, therefore, will be positioned beneath the lift-out fingers 114 when the ram assembly 17 undergoes the final stage of its downward movement. The lift-out fingers 114 will thus be forced upwardly against the action of the coil spring 115 and some pivotal movement of the supporting members 106 about the pivot pin 107 may also occur.

Upon the retraction of the machine 11, the ram assembly 17 will be raised sufficiently for the shroud ring 101 to clear the rounding die supporting jaws 47. The jaws 47 then are retracted through actuation of the cylinder 68. This will permit the lift-out fingers 114 to extend under the action of the springs 115 and 108. If the upper edge of the wheel rim 19 tends to interfere with this extension, a cam surface 126 formed at the end of the lift-out finger 114 will contact the rim and cause the supporting member 106 to pivot until the upper edge of the finger 114 registers with the underside of the rim 19 (FIG. 5). Continued upward movement of the ram assembly 17 will then cause the formed wheel assembly 18 to be lifted from the lower die assemblies so that it may readily be removed from the machine 11.

The specific construction of the press with which the wheel rounding machine 11 is associated has not been described in detail and has not been illustrated since the construction of this portion of the apparatus forms no part of the invention. It is to be understood that those skilled in the art could practice this invention in connection with any suitable type of machine. In addition, the control apparatus for achieving the sequential operation described forms no part of the invention nor does the specific sequence involved. Various other changes and modifications may be made without departing from the proper scope of fair meaning of the subjoined claims.

What is claimed is:

1. A machine for rounding assembled wheels or the like having a spider and a rim, said machine comprising a plurality of rounding die means supported for reciprocation in a generally radial direction with respect to an associated assembled wheel, means for reciprocating said rounding die means from a retracted position wherein assembled wheels may be juxtaposed to said rounding die means and a wheel rounding position wherein said rounding die means engage said rim for rounding said rim and said wheel, and means for accurately sizing and locating an opening in the spider which opening serves to locate the assembled wheel with respect to an associated vehicle.

2. A machine as set forth in claim 1 wherein the means for sizing and locating the opening in the spider is operative to size and locate the spider opening when the rounding dies are in their wheel rounding position.

3. A machine for rounding assembled wheels or the like having a spider and a rim, said machine comprising locating means adapted to coact with the spider of an assembled wheel for accurately locating the wheel, a plurality of rounding die means supported for reciprocation in a generally radial direction with respect to a wheel located by said locating means, and means for reciprocating said rounding die means from a retracted position wherein assembled wheels may be loaded onto and removed from said locating means to a wheel rounding position wherein said rounding die means engage said rim for rounding said rim.

4. A machine as set forth in claim 3 further including means for accurately sizing and locating an opening in the spider which opening serves to locate the assembled wheel with respect to an associated vehicle.

5. A machine as set forth in claim 3 further including inner die means adapted to engage the inner periphery of the wheel rim and conforming in shape substantially to the desired finished shape of the rim, said rounding die means being adapted to engage the outer periphery of the rim and move radially inwardly from their retracted position to their wheel rounding position, said rounding dies being adapted to force said rim into engagement with said inner die means when said rounding dies are in their wheel rounding position.

6. A machine as set forth in claim 3 wherein the rounding die means move radially inwardly with respect to the wheel rim from their retracted position to their wheel rounding position, the means for reciprocating said rounding die means comprising cam and follower means.

7. A machine as set forth in claim 6 further including means for accurately sizing and locating an opening in the spider which opening serves to locate the assembled wheel with respect to an associated vehicle, said last named means being effective to provide the locating and sizing of the opening after the rounding die means have moved to their wheel rounding position.

8. A machine as set forth in claim 6 wherein the cam and follower means comprise follower pins fixed relative to each of the rounding die means, a supporting member defining a plurality of radially extending slots, said follower pin means having a portion received in a perspective one of said radially extending slots for guiding said follower pin means for movement in a radial direction, and a cam ring supported for oscillating rotary movement relative to said supporting member, said cam ring having a plurality of slots formed therein juxtaposed to said slots in said supporting member and angularly disposed with respect thereto, each of said follower pin means having a portion thereof received in a respective slot of said cam ring for radial reciprocation of said follower pin means and said rounding die means upon oscillatory rotary movement of said cam ring.

9. A machine as set forth in claim 3 wherein the spider of the wheel is formed with a plurality of circumferentially spaced apertures for attachment of the wheel to an associated component of a motor vehicle, the locating means comprising a plurality of locating pins adapted to coact with the apertures in the wheel spider for locating the wheel.

10. A machine as set forth in claim 9 further including means coacting with said locating means for accurately fixing and locating the apertures in the wheel spider.

11. A machine as set forth in claim 3 further including a lower supporting member for supporting the rounding die means and the locating means, and an upper ram assembly supported for reciprocation with respect to said lower supporting member, said lower supporting member and said upper ram assembly carrying cooperating forming means for engaging the wheel spider and performing a forming operation thereupon.

12. A machine as set forth in claim 11 wherein the rounding die means are supported for radial inward movement from their retracted positions to their wheel rounding positions by the lower supporting member, and further including a shroud ring carried by said upper ram assembly, said shroud ring having an inner cylindrical surface of at least the same diameter as the diameter defined by the outer periphery of said rounding die means when said rounding die means are in their wheel rounding positions, and cooperating cam means carried by said shroud means and said rounding die means for moving said rounding die means to their wheel rounding position in the event of a failure of the operation of the means for reciprocating said rounding die means.

13. A machine as set forth in claim 11 wherein the wheel spider is formed with a plurality of circumferentially spaced apertures for attachment of the wheel to an associated component of a motor vehicle, the locating means comprising a plurality of locating pins adapted to be received in the apertures in the wheel spider for locating the wheel with respect to the lower supporting member, the cooperating forming means comprising forming means carried by the upper ram assembly and adapted to engage the apertures in the wheel spider for accurately forming and locating the spider apertures.

14. A machine as set forth in claim 11 further including lift out means carried by the upper ram assembly for engaging the rim of a wheel after it has been formed by the rounding die means for lifting the wheel from the locating means upon retraction of said upper ram assembly.

15. A machine as set forth in claim 14 wherein the lift out means include yieldable biasing means for retraction of said lift out means upon movement of the upper ram assembly toward the lower supporting means and when the rounding die means are in their wheel rounding positions.

16. A wheel rounding machine for rounding assembled wheels or the like having a spider and a rim, said means comprising a base plate, a lower die supporting means, die cushions yieldably supporting said lower die supporting means upon said base plate, pilot means fixed to said base plate and adapted to receive a hub opening in the wheel spider, a plurality of locating pin means yieldably supported by said base plate at spaced circumferential locations about said pilot means, said locating pin means being adapted to be received in spaced apertures formed in the wheel spider around its hub opening, a first inner die member affixed to said base plate and adapted to engage a portion of the inner periphery of the wheel rim, a plurality of rounding die means supported for reciprocation upon said lower die supporting means, a plurality of follower pin means each affixed to a respective one of said rounding die means, a plurality of slots formed in said lower die supporting means, said slots extending in a generally radial direction with respect to said pilot means, each of said follower pin means being slidably received in a respective one of said slots in said lower die supporting means for guiding said rounding die means for reciprocation in a radial direction, a cam ring supported for oscillating rotary movement relative to said lower die supporting means, said cam ring having a plurality of slots formed therein, each of said slots in said cam ring being disposed at an angle with respect to a respective one of said slots in said lower die supporting means, operating means supported by said lower die supporting means and operatively connected to said cam ring for oscillating said cam ring and reciprocating said rounding die means an upper ram assembly supported for reciprocation relative to said base plate from a retracted position to an engaged position, and second inner die means affixed to said upper rim assembly and adapted to engage another portion of the inner periphery of the wheel rim.

17. A wheel rounding machine as set forth in claim 16 further including means for accurately forming and locating the hub opening in the wheel spider after the rounding die means have moved into engagement with the wheel rim.

References Cited

UNITED STATES PATENTS

| | | | |
|---|---|---|---|
| 2,826,161 | 3/1958 | Palmer | 72—354 X |
| 3,222,765 | 12/1965 | Parent et al. | 29—159.1 |
| 3,263,477 | 8/1966 | Roper | 72—401 |
| 3,298,218 | 1/1967 | Gollwitzer | 72—355 |

FOREIGN PATENTS 625,768  7/1949  Great Britain.

MILTON S. MEHR, Primary Examiner

U.S. Cl. X.R.

29—159.1; 72—401